United States Patent
Berne et al.

(10) Patent No.: US 11,052,825 B2
(45) Date of Patent: Jul. 6, 2021

(54) SIDE CLEARANCE DEVICE FOR MOTOR VEHICLE, SIDE VIEWING SYSTEM AND ASSOCIATED MOTOR VEHICLE

(71) Applicant: Volvo Truck Corporation, Gothenburg (SE)

(72) Inventors: Nicolas Berne, Heyrieux (FR); Michel Pradal, Villefontaine (FR)

( * ) Notice: Subject to any disclaimer, the term of this patent is extended or adjusted under 35 U.S.C. 154(b) by 0 days.

(21) Appl. No.: 16/759,119

(22) PCT Filed: Oct. 31, 2017

(86) PCT No.: PCT/IB2017/001438
§ 371 (c)(1),
(2) Date: Apr. 24, 2020

(87) PCT Pub. No.: WO2019/086920
PCT Pub. Date: May 9, 2019

(65) Prior Publication Data
US 2020/0262352 A1    Aug. 20, 2020

(51) Int. Cl.
*B60R 1/12* (2006.01)
*H04N 5/225* (2006.01)
*H04N 7/18* (2006.01)

(52) U.S. Cl.
CPC ............. *B60R 1/12* (2013.01); *H04N 5/2253* (2013.01); *H04N 7/18* (2013.01); *B60R 2001/1253* (2013.01); *B60R 2300/20* (2013.01)

(58) Field of Classification Search
CPC ................................ B60R 1/12; H04N 5/2253
See application file for complete search history.

(56) References Cited

U.S. PATENT DOCUMENTS

| 5,342,015 | A | 8/1994 | Burton et al. |
| 2003/0026009 | A1 | 2/2003 | Vandenbrink |
| 2007/0109677 | A1 | 5/2007 | Bender et al. |
| 2011/0018699 | A1* | 1/2011 | Chen ............... B60R 1/00 340/435 |

(Continued)

FOREIGN PATENT DOCUMENTS

| DE | 20017064 U1 | 12/2000 |
| WO | 2017/178859 A1 | 10/2017 |

OTHER PUBLICATIONS

International Search Report and Written Opinion for International Patent Application No. PCT/IB2017/001438, dated Feb. 1, 2018, 10 pages.

*Primary Examiner* — Girumsew Wendmagegn
(74) *Attorney, Agent, or Firm* — Withrow & Terranova PLLC

(57) ABSTRACT

The invention concerns a side clearance device for motor vehicle comprising: a first section comprising a first end fixed with a fastening plate; the said first section extending according to a first direction (X1); a second section comprising a first end connected with a second end of the said first section; and the said second section extending according to a second direction (X2); the said first and second sections having a drag coefficient of under 0.45; the said second section possessing a terminal surface (20) between 40 and 600 mm2, opposite to the said first end of the said second section; the said terminal surface (20) being designed to extend in the field of vision of the driver when the said fastening plate is fixed onto a vehicle.

11 Claims, 3 Drawing Sheets

(56) References Cited

U.S. PATENT DOCUMENTS

Figure 1:
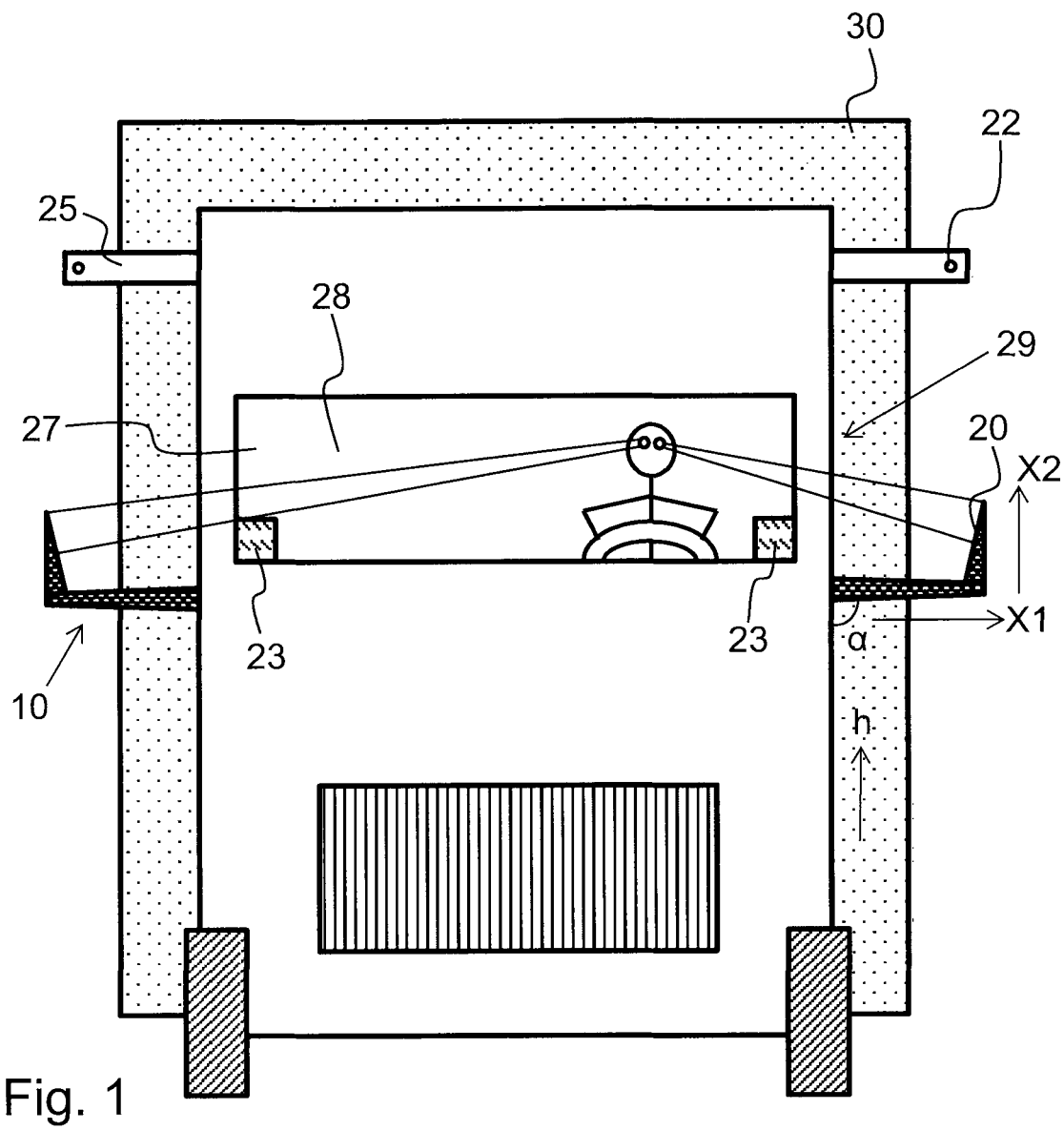

2014/0268378 A1* 9/2014 Henderson ............ B60R 1/0605
  359/841
2016/0207466 A1* 7/2016 Lynam ...................... B60R 1/06
2016/0243988 A1* 8/2016 Peterson ............ G06K 9/00805
2017/0043719 A1  2/2017 Wippler

* cited by examiner

SIDE CLEARANCE DEVICE FOR MOTOR VEHICLE, SIDE VIEWING SYSTEM AND ASSOCIATED MOTOR VEHICLE

This application is a 35 USC 371 national phase filing of International Application No. PCT/IB2017/001438, filed Oct. 31, 2017, the disclosure of which is incorporated herein by reference in its entirety.

TECHNICAL FIELD

This invention concerns the domain of motor vehicle equipment and, more specifically, equipment improving the driver field of vision.

The invention is particularly adapted for improving the driver's estimation of the distance between a side of a vehicle and elements disposed near this side.

BACKGROUND OF THE INVENTION

The detection of elements disposed on the rear sides of a vehicle is classically realized by the side mirrors. These side mirrors are fixed on doors and extend in front of the side windows so that a driver can see these side mirrors through side windows.

Moreover, the driver uses theses side windows to detect elements in the front sides of the vehicle with a direct vision, i.e. without using the reflection of side mirrors. For instance, when the driver of a truck makes a parallel parking near a wall, he may use the side mirrors to estimate the distance between sides of the truck and the wall.

A side mirror of a truck comprises generally two fastening plates with mechanical means adapted to fix the said fastening plates with a door. For instance, mechanical means are holes for the passing of screws. Two arms extend from plates and get away from the door. The end of each of these two arms is fixed onto a support piece for the mirror.

To improve the vision towards the rear sides, or to comply with a wide trailer, it is required to increase the length of the arms and/or the sizes of the support pieces and the mirrors. However, the increasing of the size of these elements would reduce the field of direct vision through side windows. Moreover, these elements induce frictions with air when the vehicle is moving.

Thus, the increasing of the size of these elements raises the friction and increases the consumption. It is possible to limit frictions by selecting aerodynamics elements but the utilization of aerodynamics elements would limit the direct vision through side windows.

Another solution is to use a vehicle side viewing system comprising a side view camera and a driver's side up display. One type of side viewing system is disclosed in the US patent application No US 2017/043719. This kind of side viewing system can replace side view mirrors and improve vehicle aerodynamics.

However, with this kind of side viewing system, no element of the vehicle is placed in the field of vision of the driver through side windows. Thus, the driver cannot estimate the distance between a side of a vehicle and elements disposed near this side.

The purpose of the invention is to improve the driver's estimation of the distance of elements which are visible through the side windows, especially when using a side viewing system.

OUTLINE OF THE INVENTION

This invention proposes to address this technical issue by a side clearance device which has a small impact on frictions with air and a terminal surface extending in the field of vision of a driver through the side window. The driver, knowing the distance of this terminal surface with the vehicle, can estimate the distance between a side of a vehicle and elements disposed near this side.

Accordingly, in a first aspect, the invention concerns a side clearance device for motor vehicle, said side clearance device comprising:

- a fastening plate with mechanical means adapted to fix said fastening plate with a vehicle;
- a first section comprising a first end fixed with the said fastening plate;
- the said first section extending according to a first direction in order that, when said fastening plate is fixed onto a vehicle, said first section gets away from the vehicle from the said fastening plate; and
- a second section comprising a first end connected with a second end of the said first section, the said second end of the said first section being opposed to the said first end of the said first section;
- the said second section extending according to a second direction in order that, when the said fastening plate is fixed onto a vehicle, the said second section extends almost along the height of the vehicle.

This invention is characterized in that:
- the said first and second sections have a drag coefficient below 0.45; and
- the said second section possesses a terminal surface between 40 and 600 mm$^2$, opposed to the said first end of the said second section;
- the said terminal surface being designed to extend in the field of vision of the driver when the said fastening plate is fixed onto a vehicle.

In view of the invention, a "side clearance device" corresponds to motor vehicle equipment in the form of a mechanical element having two sections with different orientations. Numerous mechanical elements can be used to form one or both sections, like wings, tubular structures.

The feature regarding the drag coefficient of sections reveals that this side clearance device is an aerodynamic element which has an insignificant impact on the resistance of the vehicle through the air.

In fluid dynamics, the drag coefficient is a dimensionless quantity that is used to quantify the drag or resistance of an object in a fluid environment, such as air in the context of the invention. It is used in the drag equation in which a lower drag coefficient indicates the object will have less aerodynamic drag. The drag coefficient is always associated with a particular surface area. In automotive design, this particular surface corresponds to the front surface of the vehicle.

The drag coefficient can be measured in a wind tunnel when side clearance device is mounted on a vehicle. Air is pushed against the vehicle front surface. The greater the air push is made on the vehicle, the more the vehicle moves backward. The backward motion of the vehicle causes to move a mass. The more the mass moves during a predetermined time, the greater the drag coefficient becomes.

Drag coefficient of a vehicle is the sum of all drag coefficients of elements that would induce a resistance through the air flow. Thus, the drag coefficient of a side clearance device can be obtained by the difference of a measure in a wind tunnel between a vehicle comprising a side clearance device and the same measure with the same vehicle without the side clearance device. A side mirror has generally a drag coefficient of 0.8.

Thus, the invention relates to an aerodynamic piece which permits to place a terminal surface in the field of vision of a driver through the side window. This terminal surface allows the driver to estimate the distance between a side of a vehicle and elements disposed near this side.

According to one embodiment, at least one section has a streamlined body. A streamlined body is a well-known shape able to reduce the drag coefficient.

According to one embodiment, the said first and second sections have a drag coefficient below 0.3. This feature improves the aerodynamic of a vehicle.

According to one embodiment, the said side clearance device comprises a camera configured to capture at least a rear side view of a vehicle when the said fastening plate is fixed onto a vehicle. The side clearance device being preferably installed with a side viewing system or Camera Monitoring System, camera of the side viewing system can be mounted on the side clearance device to capture a rear side view with a distance from the side of the vehicle.

According to one embodiment, first and second sections are connected with a pivot. This pivot permits to move the terminal surface in comparison with the first section if the vehicle requires a small width.

According to one embodiment, first or second section comprises a fuse part configured to break in case of impact on the said second section. This embodiment protects the side of the vehicle, especially the camera mounted either on the side clearance device or on a wing fixed to the side of the vehicle, because an impact on the second section preferably breaks the clearance device on the fuse part.

According to one embodiment, said terminal surface has a dedicated colour which differs from the colour of the said first section. The vision of the terminal surface can be improved by a remarkable colour.

This colour can be highlighted with a different colour with other parts of the side clearance device.

In a second consideration, the invention concerns a side viewing system for motor vehicle comprising:
at least one camera configured to capture at least a rear side view of a vehicle;
at least one control screen connected with the said at least one camera and configured to display images from the said at least one camera;
the said at least one control screen comprising mechanical means adapted to fix the said at least one control screen inside a vehicle in the field of vision of a driver; and
at least one side clearance device according to the first consideration of the invention.

This side clearance device comprises a camera connected to a control screen to display the view of the area associated with a side clearance device to estimate the distance between a side of a vehicle and elements disposed near this side.

A side viewing system comprising a camera configured to capture at least a rear side view of a vehicle and connected to a control screen to display the view from the camera to the driver on a monitor is often referred to as a Camera Monitoring System (CMS).

Camera of the side viewing system or CMS can be mounted on the side clearance device to capture a rear side view with a distance from the side of vehicle.

According to one embodiment, at least one camera is mounted on at least one wing. This embodiment limits the required size of the side clearance device because the camera is not supported by side clearance device but by a dedicated element: a wing.

In a third consideration, the invention concerns a vehicle comprising:
a driver compartment comprising a front window and side windows; and
a side viewing system according to the second consideration of the invention;
the side clearance device being disposed in order that the terminal surface extends in the field of vision of a driver through a side window.

According to one embodiment, the said vehicle comprises two side clearance devices extending in the field of vision of a driver through two side windows facing to each other.

According to one embodiment, the said vehicle is a truck.

SUMMARY DESCRIPTION OF THE FIGURES

Figure 2A:
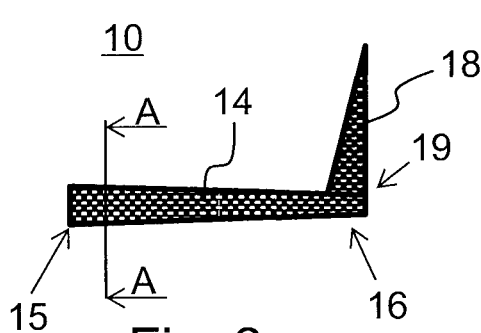
Figure 2B:
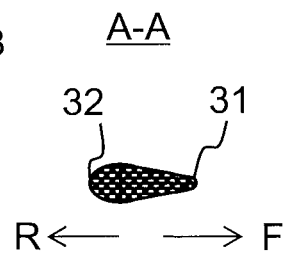
Figure 2C:
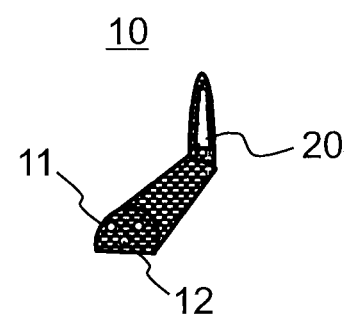
Figure 3:
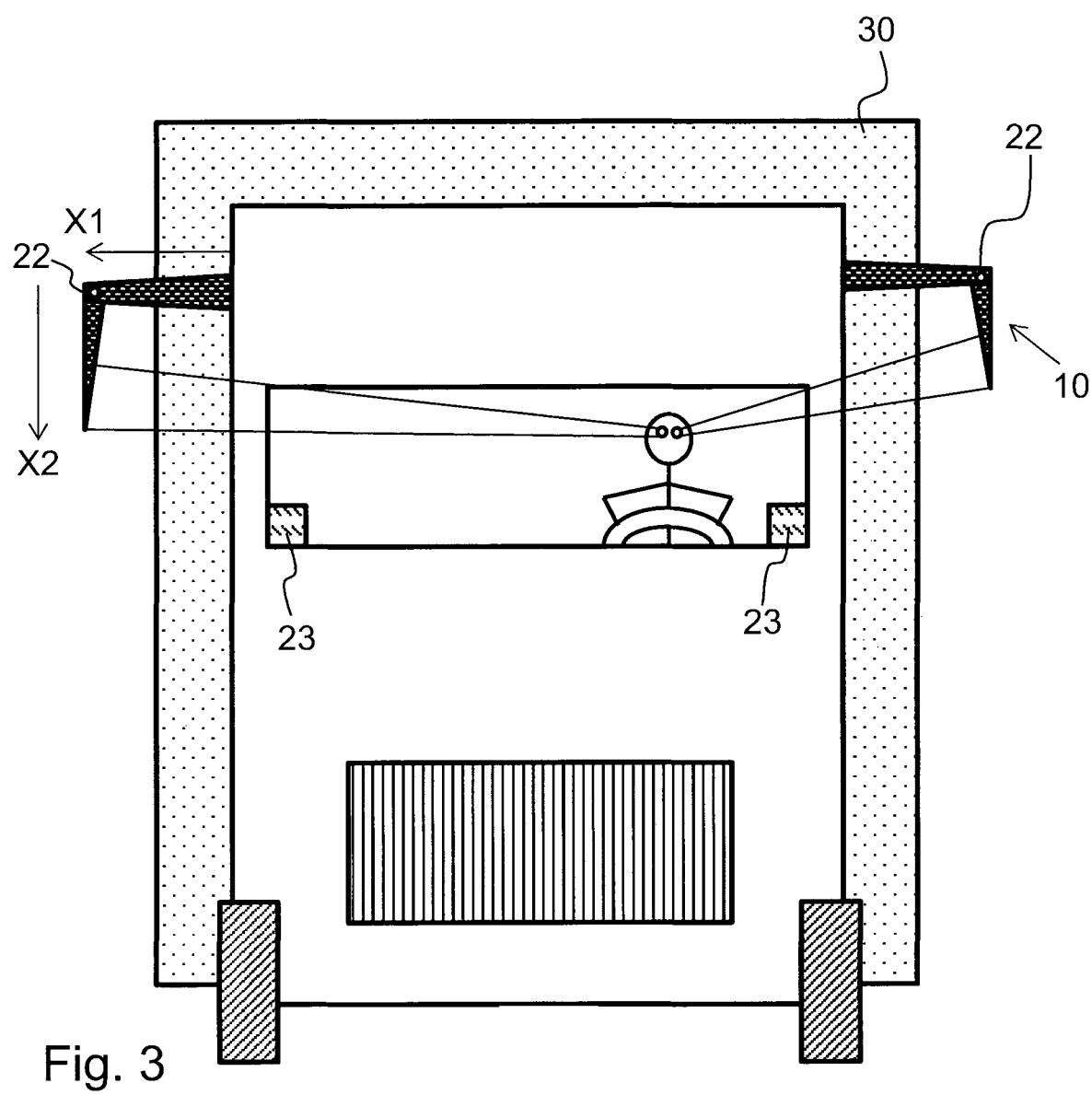
Figure 4:
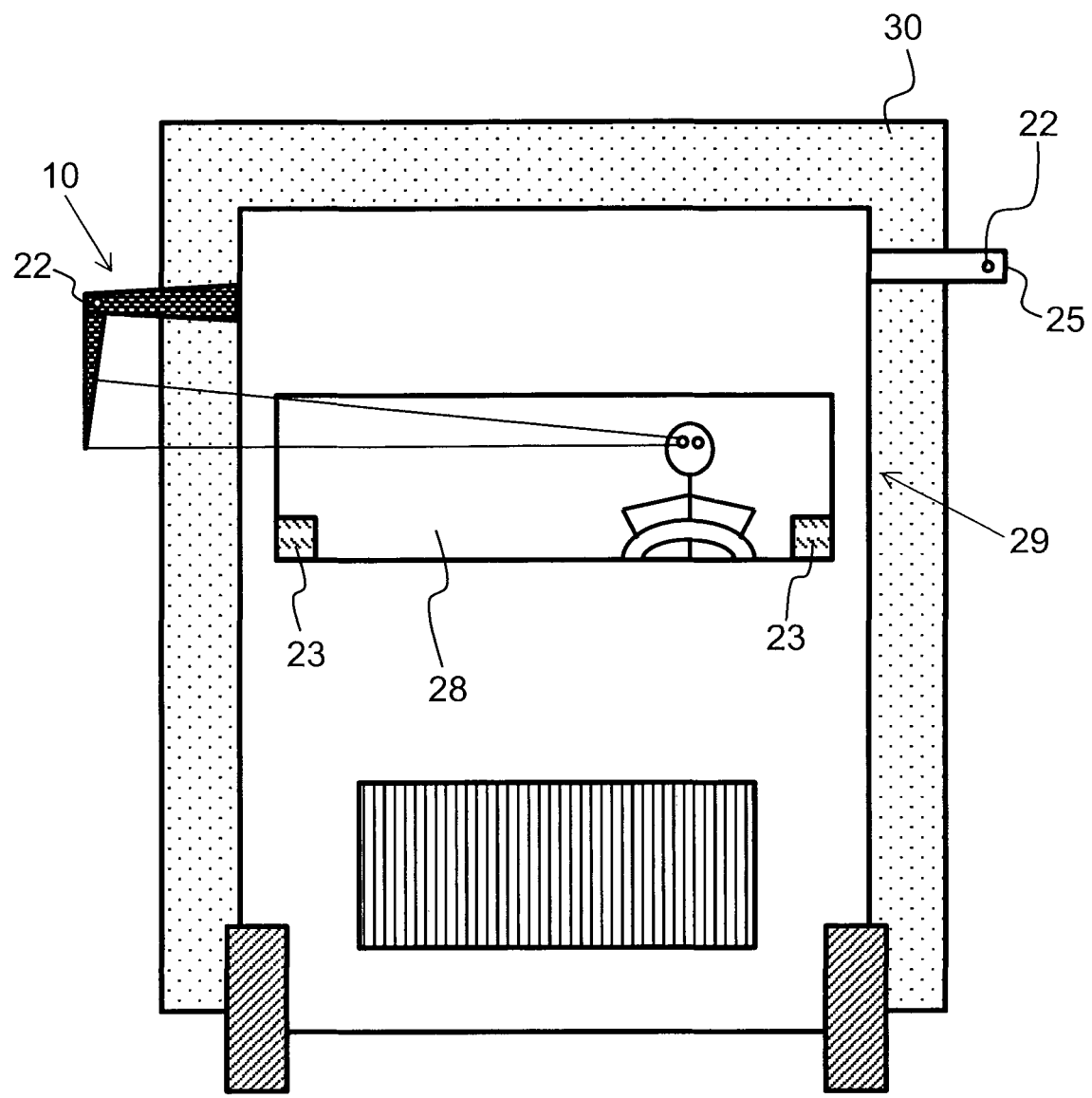

The method of producing the invention and the resulting advantages are evident in the following embodiment, given for information but which is not limited, supported by the attached figures in which FIGS. 1 to 4 represent:

FIG. 1: a schematic front view of a truck comprising a side viewing system and two side clearance devices according to a first embodiment of the invention;

FIG. 2a-2c: three different views of one side clearance device of FIG. 1;

FIG. 3: a schematic front view of a truck comprising two side clearance devices integrating two cameras of a side viewing system or CMS according to the second embodiment of the invention; and FIG. 4: a schematic front view of a truck comprising a side clearance device integrating a camera of a side viewing system or CMS according to the third embodiment of the invention.

DETAILED DESCRIPTION OF THE INVENTION

FIG. 1 illustrates a front view of a truck comprising a driver compartment 27 with a front window 28 and two side windows 29. The truck tows a trailer 30 which is, in the specific embodiment shown, larger than the width of the driver compartment 27. However, there exist also cases where trailer could be almost as large as or even less large than the width of the driver compartment, for which the present solution can also be implemented.

The control of the rear sides of the truck is realized by a side viewing system comprising two cameras 22 and two control screens 23 (CMS). The cameras 22 are fixed one on each side of the driver compartment 27 by aerodynamic wings 25 getting away from the sides of the driver compartment 27 in order to capture the rear sides of the trailer 30. The control screens 23 are fixed with mechanical means, for instance screws or glue, on the angles of the driver compartment 27 where the side mirrors are classically visible by the driver.

The issue of the estimation of the distance between a side of the driver compartment 27 and elements disposed near this side is addressed by two side clearance devices 10.

A side clearance device 10 is depicted by FIGS. 2a-2c. This side clearance device 10 comprises a first section 14 and a second section 18 connected together. The first section 14 comprises a first end 15 fixed onto a fastening plate 11 in order to fix the side clearance device 10 onto the door or any part on the side of the truck including protruding on the side but fixed on the roof of the vehicle. For this purpose, the fastening plate 11 comprises mechanical means, such as holes 12 for the passing of screws or rivets. The fastening plate 11 can be realized by a thin metallic plate, with a thickness between 0.1 cm and 2 cm.

The first section 14 extends according to a first direction X1. When the fastening plate 11 is fixed onto the door of the truck, the first section 14 gets away from this door along the direction X1.

In FIG. 1, the direction X1 is almost perpendicular with the direction of the height h of the door but the angle α between the direction of the height h of the door and the direction X1 of the first section 14 can be between 30 and 130 degrees. This first section 14 can be realized in carbon or in a composite material with a small thickness due to the reason that, contrary to a classic side mirror, the first section 14 has less weight to carry.

As shown in FIG. 2b, the first section 14 has a streamlined body wherein the thin part 31 is oriented in the direction of the front F of the truck and the wide part 32 is oriented in the direction of the rear R of the truck. The thickness of the first section 14 decreases as the first section 14 gets away from the door. For instance, the thickness of the first section 14 can have a thickness between 5 and 10 cm at the level of the first end 15 and between 3 and 5 cm at the level of the second end 16, opposed to the first end 15.

A second section 18 is connected with the first section 14 at the level of this second end 16. This second section 18 can be fixed onto the second end 16 of the first section 14, for instance by screws or glue, or both sections 14, 18 can be connected with a pivot. A pivot permits to rotate the second section 18 according to the first section 14 in order to improve the driver's preferences or to limit the size of the side clearance device 10. Moreover, both sections 14, 18 can be fixed with a fuse part configured to break in case of impact on the second section 18. In another embodiment, this fuse part can be placed on one of the sections 14, 18.

The second section 18 comprises a first end 19 connected with the second end 16 of the first section 14. This second section 18 extends in another direction X2. When the fastening plate 11 is fixed onto the door or any part on the side of the truck, alternatively protruding on the side but fixed on the roof of the vehicle, the second section 18 extends almost along the direction of the height h of the door. The second section 18 comprises a terminal surface 20 facing to the first end 19. The length of the second section 18 and the angle between both sections 14, 18 are designed such as that the terminal surface 20 extends in the field of vision of the driver when the fastening plate 11 is fixed onto the truck. In FIG. 1, the fastening plate 11 is fixed under the side window. Thus, the second section 18 extends upwards.

The terminal surface 20 has a surface between 40 and 600 mm² which permit to guaranty the vision of this terminal surface 20 by the driver. To improve this vision, this terminal surface 20 can have a dedicated colour which differs from the colour of the first section 14. Preferably, the second section 18 has also a streamlined body as disclosed with the first section 14. This particular shape of both sections 14, 18 is designed to reduce the drag coefficient of the side clearance device 10 to less than 0.02. Other shapes could be considered for both sections 14, 18 if, at the minimum, the drag coefficient of the side clearance device 10 is under 0.45.

In the first embodiment of FIG. 1, the side viewing system is independent to the side clearance devices 10. FIG. 2 illustrates a second embodiment wherein the cameras 22 of the side viewing system are integrated in the side clearance devices 10.

Each camera 22 is mounted at the second end 16 of the first section 14. Each side clearance device 10 is fixed onto the door or any part on the side of the vehicle over the side window, alternatively protruding on the side but fixed on the roof of the vehicle. Thus, the second section 18 extends downwards.

In the first embodiment, the driver can see the terminal surfaces 20 of each side clearance device 10 through the bottom of the associated side windows. In this second embodiment, the driver can see the terminal surfaces 20 of each side clearance device 10 through the top of the associated side windows.

A third embodiment, illustrated in FIG. 4, depicts a hybrid solution wherein a unique side clearance device 10 is used for the side window side opposite to the driver side. The rear view of the driver side is realized by a camera mounted on a wing as disclosed in FIG. 1 and the rear view of the side opposite to the driver side is realized by a camera mounted on the side clearance device 10 as disclosed in FIG. 2.

In figures, the invention is depicted in relation with a truck but the invention can be applied for other vehicle types, such as car, coach or tractor. Moreover, the form of the side clearance device 10 can be adapted to the vehicle as long as the side clearance device 10 has a drag coefficient of under 0.45 and a terminal surface, visible by the driver, with a surface between 40 and 600 mm². Thus, the side clearance device 10 helps the driver to estimate the distance between a side of a vehicle and elements disposed near this side and has a small impact on frictions with air. Therefore, the consumption of the vehicle is reduced.

The invention claimed is:

1. A side-viewing system for a motor vehicle comprising:
    at least one camera configured to capture at least a rear side view of a vehicle;
    at least one control screen connected with the at least one camera and configured to display images from the at least one camera;
    the at least one control screen configured to fix inside the vehicle in a field of vision of a driver; and
    at least one side clearance device comprising:
        a fastening plate configured to fix to a vehicle;
        a first section comprising a first end fixed with the fastening plate, wherein when the fastening plate is fixed onto the vehicle, the first section extends away from the vehicle from the fastening plate; and
        a second section comprising a first end connected with a second end of the first section, the second end of the first section being opposed to the first end of the first section, wherein when the fastening plate is fixed onto a vehicle, the second section extends about along a height of the vehicle;
    wherein the first and second sections have a drag coefficient of under 0.45;
    wherein the second section possesses a terminal surface between 40 and 600 mm², opposed to the first end of the second section;
    wherein the terminal surface is designed to extend in a field of vision of a driver when the fastening plate is fixed onto the vehicle; and
    wherein the terminal surface extends further away from the vehicle than the at least one camera.

2. The side-viewing system of claim 1, wherein at least one of the first and second sections has a streamlined body.

3. The side-viewing system of claim 1, wherein the first and second sections have a drag coefficient of under 0.3.

4. The side-viewing system of claim 1, wherein the side clearance device comprises a camera configured to capture at least a rear side view of the vehicle when the fastening plate is fixed onto the vehicle.

5. The side-viewing system of claim 1, wherein the first and the second sections are connected with a pivot.

6. The side-viewing system of claim 1, wherein the first or second section comprises a fuse part configured to break in case of impact on the second section.

7. The side-viewing system of claim 1, wherein the terminal surface has a dedicated color that differs from the color of the first section.

8. The side-viewing system of claim 1, wherein the at least one camera is mounted on at least one wing.

9. A vehicle comprising:
- a driver compartment comprising a front window and two side windows; and
- a side-viewing system, comprising:
  - at least one camera configured to capture at least a rear side view of a vehicle;
  - at least one control screen connected with the at least one camera and configured to display images from the at least one camera;
  - the at least one control screen configured to fix inside the vehicle in a field of vision of a driver; and
  - at least one side clearance device comprising:
    - a fastening plate configured to fix to a vehicle;
    - a first section comprising a first end fixed with the fastening plate, wherein when the fastening plate is fixed onto the vehicle, the first section extends away from the vehicle from the fastening plate; and
    - a second section comprising a first end connected with a second end of the first section, the second end of the first section being opposed to the first end of the first section, wherein when the fastening plate is fixed onto a vehicle, the second section extends about along a height of the vehicle;
  - wherein the first and second sections have a drag coefficient of under 0.45;
  - wherein the second section possesses a terminal surface between 40 and 600 mm$^2$, opposed to the first end of the second section; and
  - wherein the terminal surface is designed to extend in the field of vision of the driver when the fastening plate is fixed onto the vehicle;
  - wherein the terminal surface extends further away from the vehicle than the at least one camera;
  - the side clearance device being disposed in order that the terminal surface extends in the field of vision of the driver through a side window.

10. The vehicle of claim 9, wherein the vehicle comprises two side clearance devices extending in the field of vision of the driver through two side windows facing each other.

11. The vehicle of claim 9, wherein the vehicle is a truck.

* * * * *